United States Patent
Friedman et al.

(10) Patent No.: US 6,596,400 B1
(45) Date of Patent: Jul. 22, 2003

(54) ACRYLATE BLENDS AND LAMINATES USING ACRYLATE BLENDS

(75) Inventors: Michael Friedman, Wayne, NJ (US); Louis Laucirica, Essex Falls, NJ (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 0 days.

(21) Appl. No.: 08/219,317

(22) Filed: Mar. 29, 1994

(51) Int. Cl.[7] .......................... B32B 17/10; B32B 27/00; B32B 27/08
(52) U.S. Cl. ..................... 428/441; 428/442; 428/500; 428/515; 428/522
(58) Field of Search ................................ 428/442, 522, 428/441, 500, 515

(56) References Cited

U.S. PATENT DOCUMENTS

| | | | |
|---|---|---|---|
| 3,464,949 A | 9/1969 | Wartman et al. | 260/32.6 |
| 3,488,715 A | 1/1970 | Atkins | 161/203 |
| 3,494,903 A | 2/1970 | Kochbar | 260/86.7 |
| 4,351,931 A * | 9/1982 | Armitage | 428/461 |
| 4,358,329 A | 11/1982 | Masuda | 156/106 |
| 4,382,996 A | 5/1983 | Mori et al. | 428/442 |
| 4,389,508 A | 6/1983 | Mori et al. | 524/548 |
| 4,397,976 A | 8/1983 | Mori et al. | 524/178 |
| 4,600,627 A * | 7/1986 | Honda et al. | 428/442 |
| 4,681,810 A | 7/1987 | Gomez | 428/429 |
| 5,346,735 A * | 9/1994 | Logan et al. | 428/36.7 |

FOREIGN PATENT DOCUMENTS

| | | | | |
|---|---|---|---|---|
| EP | 145213 A2 | 6/1985 | | H01B/3/44 |
| EP | 244982 A2 | 11/1987 | | C08J/5/18 |
| EP | 287403 A2 | 10/1988 | | B32B/27/16 |
| EP | 0517114 | 12/1992 | | |
| EP | 0602644 | 6/1994 | | |
| GB | 1154620 | * | 4/1969 | 428/522 |
| WO | WO9306137 | * | 4/1993 | 525/228 |

OTHER PUBLICATIONS

Batchelor et al., "Glass Laminates", (May 20, 1980) C.A. #93:151389.*
Dynamit, "Laminates Safety Glass", (Feb. 15, 1978) C.A. #89:7330.*

* cited by examiner

Primary Examiner—Nathan M. Nutter
(74) Attorney, Agent, or Firm—Mike W. Crosby

(57) ABSTRACT

The present invention is a film formed from an acrylate blend. The preferred blend is a film comprising components (a) and (b), component (a) being an ethylene butyl acrylate copolymer (EBAC) which is less than about 95 percent percent by weight of a total weight of components (a) and (b), wherein the EBAC has a content of acrylate groups from about 8 to about 36 percent by weight of the total weight of the EBAC; and component (b) being an ethylene methyl acrylate copolymer (EMAC) which is greater than about 5 percent by weight of the total weight of components (a) and (b), wherein the EMAC has a content of acrylate groups from about 8 to about 42 percent by weight of the total weight of the EMAC.

The invention further includes a process for manufacturing this film for use as an interlayer in laminates comprising the steps of mixing the melt of thermoplastic polymer resins to form an ethylene butyl acrylate/ethylene methyl acrylate blend and forming the ethylene butyl acrylate/ethylene methyl acrylate blend of thermoplastic resins into a film for use as an interlayer in laminates. The invention still further includes a laminate comprising at least two sheets and at least one interlayer, the interlayer(s) being in between the sheets and wherein the interlayer is comprised of the film described above. The invention still further includes a laminate comprising an acrylate film laminated between two lamina wherein the film and the laminate have properties similar to PVB and laminates made with PVB, respectively.

28 Claims, No Drawings

ACRYLATE BLENDS AND LAMINATES USING ACRYLATE BLENDS

BACKGROUND OF THE INVENTION

1. Field of the Invention

The invention relates to acrylate copolymer blends and in particular to ethylene methylacrylate copolymer/ethylene butylacrylate copolymer blends and their use as a layer or interlayer which is bonded to mineral (e.g., glass) or polymer substrates for the manufacture of bilayer or multiple layer laminates. In particular, these films are useful between two or more transparent layers made of glass or polymer materials for use as safety glass for automotive and architectural applications.

2. Technology Review

For over three decades significant efforts have been made to find an interlayer film which performs as well as polyvinylbutyral (PVB) without its inherent drawbacks. A number of polymers and formulations based on them have been used to produce transparent interlayer films for bilayer and multiple layer mineral (e.g., glass) or polymer sheets, particularly for flat glass products in automotive and architectural safety glass applications. The major glass laminate manufacturers for the most part have still found that for their cost polyvinylbutyral (PVB) compositions provide the best overall performance and therefore these have been the interlayer of choice for laminated glass applications.

The performance of the interlayer films is based on film characteristics such as tensile strength, elongation at break, softening point and glass adhesion strength and laminate properties such as luminous transmittance, boil test stability, humidity test stability, light stability and impact and penetration resistance. While conventional PVB interlayers perform well, they do suffer from several drawbacks.

The major drawback of PVB is its moisture sensitivity. This is important because during storage and use under what would be considered typical conditions in a flat glass manufacturing environment there is the potential for significant increases in moisture content. The increased moisture in interlayer films results in increased haze and may cause bubble formation in the final laminated flat glass products which is unacceptable to both the manufacturers and their customers. Therefore, special precautions have to be taken to keep the moisture content of the PVB film and ulitmately the haze of the laminated flat glass products to an optimum. These special precautions may include reducing storage times of the PVB film to a minimum, refrigeration of the PVB film prior to lamination, pre-drying of the PVB film and/or the use of dehumidifiers in the clean rooms used for preparing the laminates. This both increases the cost and the difficulty in manufacturing laminates made with a polyvinyl butyral interlayer. Even then when the edges of the laminated glass are exposed to moisture, haze will develop.

Another drawback of PVB is the need for a plasticizer in film for bonding the PVB to the glass. The plasticizer tends to migrate over time leading to changesin the properties of the laminate and in particular delamination will begin to occur at the edges of the laminated glass due to loss of the plasticizer.

The other polymers and formulations which have been used or tried include those based on polyurethane (PU), polyvinylchloride (PVC), ethylene copolymers such as ethylenevinylacetate (EVA), polymeric fat acid polyamide (PAM), polyester resins such as polyethyleneterephtalate (PET), silicone elastomers (SEL), epoxy resins (ER) or polycarbonates such as elastomeric polycarbonates (PC and EPC). While many of these polymers and formulations do not have as relatively significant a moisture absorption problem as PVB, they do lack the overall performance of the PVB films at comparable costs. Further, some of these polymers and formulations require enhanced processing such as irradiation or the use of additional chemical components such as plasticizers which affect the cost and properties of the film and the flat glass products made using the film. For example, plasticizers will tend to migrate over time further affecting the properties of both the film and the products made using the film.

An object of this invention is to produce a polymer film which has a tensile strength, moisture absorption, elongation at break, softening point and a glass adhesion strength which are comparible or superior to PVB, and which can be incorporated in laminated glass products such as windshield and architectural safety glass that have a luminous transmittance, boil test stability, humidity test stability, light stability and impact and penetration resistance comparible or superior to those made with PVB.

A further object of this invention is to produce an ethylene acrylate copolymer blend and film which is useful as a component of optical laminates.

A further object of this invention is to produce an ethylene acrylate copolymer blend and film which can be processed into an interlayer under conditions similar to those used for processing PVB.

SUMMARY OF THE INVENTION

The present invention comprises a film formed from an acrylate blend. The preferred blend comprising components (a) and (b), component (a) being an ethylene butyl acrylate copolymer (EBAC) which is less than about 95 percent percent by weight of a total weight of components (a) and (b), wherein the EBAC has a content of acrylate groups from about 8to about 36 percent by weight of the total weight of the EBAC; and component (b) being an ethylene methyl acrylate copolymer (EMAC) which is greater than about 5 percent by weight of the total weight of components (a) and (b), wherein the EMAC has a content of acrylate groups from about 8 to about 42 percent by weight of the total weight of the EMAC.

The invention further includes a process for manufacturing this film comprising the steps of mixing the melt of thermoplastic polymer resins to form an ethylene butyl acrylate/ethylene methyl acrylate blend and forming the ethylene butyl acrylate/ethylene methyl acrylate blend of thermoplastic resins into a film. The invention still further includes a laminate comprising at least a first layer which is typically transparent and at least one layer comprised of the film described above. The invention still further includes a laminate comprising an acrylate film laminated between two lamina wherein the film and the laminate have properties similar to PVB and laminates made with PVB, respectively.

DETAILED DESCRIPTION OF THE INVENTION

The present invention is a film which has particular utility in glass laminates. The film comprises a blend of two or more acrylates. Examples of these acrylates include ethylene butyl acrylate, ethylene methyl acrylate, isobutylacrylate, and ethylene propyl acrylate. These examples are; however, given by way of illustration and not by way of limitation. The film, preferably, comprises a blend of two components.

These being component (a) which is an ethylene butyl acrylate copolymer and component (b) which is an ethylene methyl acrylate copolymer.

The ethylene butyl acrylate (EBAC) of component (a) has a content of acrylate groups from about 8 to about 36 percent, preferably from about 16 to about 26 percent by weight and more preferably from about 18 to about 22 percent by weight of the total weight of the ethylene butyl acrylate (EBAC).

The ethylene methyl acrylate of component (b) has a content of acrylate groups from about 8 to about 42 percent, preferably from about 20 to about 32 percent, and more preferably from about 22 to about 27 percent by weight of the total weight of the ethylene methyl acrylate (EMAC).

The melt flow rate of the ethylene butyl acrylate copoylmer (EBAC) used as component (a) of the film as measured by ASTM Test Method D-1238 is preferably from about 0.5 to about 20.0 grams/10 minutes, more preferably is from about 0.5 to about 10 grams/10 minutes, and most preferably is from about 0.5 to about 6.0 grams/10 minutes.

The melt flow rate of the ethylene methyl acrylate copoylmer (EMAC) used as component (b) of the film as measured by ASTM Test Method D-1238 is preferably from about 0.5 to about 100.0 grams/10 minutes, more preferably is from about to about 20 grams/10 minutes, and most preferably is from about 2.0 to about 6.0 grams/10 minutes.

The amount of component (a) present in the film is less than about 95 percent by weight of the total weight of components (a) and (b), and the amount of component (b) present in the film is greater than about 5 percent by weight of the total weight of components (a) and (b). Preferably, the amount of component (a) present in the film is from about 95 percent to about 1 percent by weight of the total weights of components (a) and (b), and the amount of component (b) present in the film is from about 5 percent to about 99 percent by weight of the total weights of components (a) and (b). Still preferably, the amount of component (a) is from about 95 percent to about 5 percent by weight of the total weight of components (a) and (b), and the amount of component (b) present in the film is from about 5 percent to about 95 percent by weight of the total weight of components (a) and (b). More preferably, the amount of component (a) is from about 50 percent to about 5 percent by weight of the total weight of components (a) and (b), and component (b) is from about 50 percent to about 95 percent by weight of the total weight of components (a) and (b), and more preferably component (a) is from about 20 percent to about 5 percent by weight of the total weight of components (a) and (b), and component (b) is from about 80 percent to about 95 percent by weight of the total weight of components (a) and (b).

The relative amounts of components (a) and (b) may be varied within the defined ranges in order to satisfy the needs of a particular application or process. Variation of the components further depends on other variables including for example the nature of the substrate or laminus (e.g., whether it is a polymer or a glass). Changes in the relative amounts of (a) and (b) lead to changes in properties including for example transparency, haze, tensile modulus, softening point and penetration resistance.

The film of the invention may employ one or more additives. All of the additives are designated in this specification as component (c). The additives include for example cross-linking agents, coupling agents, nucleation agents, UV-light absorbers, IR-light absorbers, pigments and other additives depending on the type and application of the final laminated product. This list of additives is by no means exhaustive and is therefore given by way of illustration and not by way of limitation.

Preferably, the amount of the additives as a group called component (c) present in the film may consist of from about 0.25 percent to about 15.0 percent by weight of the total weight of components (a), (b), and (c), more preferably is from about 0.5 percent to about 10.0 percent by weight of the total weight of components (a), (b), and (c), and most preferably is from about 1.0 percent to about 5.0 percent by weight of the total weight of components (a), (b), and (c).

Preferably, the film comprises a coupling agent and a clarifying agent known as components (c) (i) and (c) (ii), respectively; and more preferably the film further comprises a cross-linking agent known as component (c)(iii).

Preferably, the amount of the coupling agent (c) (i) present in the film consists of from about 0.10 percent to about 6.0 percent by weight of the total weight of components (a), (b) and (c), the amount of clarifying agent (c) (ii) present in the film consists of from about 0.05 percent to about 3.0 percent by weight of the total weight of components (a), (b) and (c), and the amount of cross-linking agent present in the film consists of up to about 5.0 percent by weight of the total weight of components (a), (b) and (c). Still preferably, the amount of the coupling agent (c) (i) present in the film consists of from about 0.10 percent to about 4.0 percent by weight of the total weight of component (a), (b) and (c), the amount of clarifying agent (c) (ii) present in the film consists of from about 0.15 percent to about 3.0 percent by weight of the total weight of components (a), (b) and (c), and the amount of cross-linking agent present in the film consists of up to about 4.0 percent by weight of the total weight of components (a), (b) and (c). More preferably, the amount of the coupling agent (c) (i) present in the film consists of from about 0.20 percent to about 2.0 percent by weight of the total weight of component (a), (b) and (c), the amount of clarifying agent (c) (ii) present in the film consists of from about 0.50 percent to about 2.0 percent by weight of the total weight of components (a), (b) and (c), and the amount of cross-linking agent present in the film consists of up to about 3.5 percent by weight of the total weight of components (a), (b) and (c). Most preferably, the amount of the coupling agent (c) (i) present in the film consists of from about 0.20 percent to about 1.0 percent by weight of the total weight of component (a), (b) and (c), the amount of clarifying agent (c)(ii) present in the film consists of from about 0.50 percent to about 1.5 percent by weight of the total weight of components (a), (b) and (c), and the amount of cross-linking agent present in the film consists of from about 0.30 percent to about 2.5 percent by weight of the total weight of components (a), (b) and (c).

Cross-linking agents may be used to increase the softening point of the film. The preferred cross-linking agent is an organic peroxide, and is chosen from peroxides with appropriate kinetics of degradation to be stable enough during mixing of the formulation. This includes peroxide compounds preferably having at least a 10 hour half-life at decomposition temperatures greater than 70° C., and more preferably only includes compounds having at least a 10 hour half-life at decomposition temperatures greater than 100° C. The half-life of the organic peroxides is defined as the time in which half the chemical decomposes at the given temperature.

Examples of cross-linking agents which may be used include 2,5-dimethylhexane-2,5-dihydroperoxide; 2,5-dimethyl-2,5-di(t-butylperoxy)hexane-3; di-t-butyl peroxide; t-butylcumyl peroxide; 2,5-dimethyl-2,5-di(t-butylperoxy)hexane; dicumyl peroxide; a, a-bis (t-butylperoxyisopropyl) benzene; n-butyl-4,4-bis(t-butylperoxy)valerate; 2,2-bis (t-butylperoxy) butane; 1,1-bis (t-butylperoxy) cyclohexane; 1,1-bis(t-butylperoxy)-3,3,5-trimethyl cyclohexane; t-butylperoxy benzoate; benzoyl peroxide; or combinations of these. The examples of peroxides are given by way of illustration and not by way of limitation. The more preferred cross-linking agent is dicumyl peroxide.

Cross-linking may also be accomplished by electron beam treatment of the film to increase the softening point. The electron beam intensity is preferably in the range of from about 2 to about 20 MRads for a time sufficient to increase. the softening point to between about 110 to about 125° C.

Coupling agents may be used to increase the bondability of the film to a lamina without pre-treatment of the surface of the lamina with primers. The preferred coupling agents are silane coupling agents. Examples of silane coupling agents which may be used include for example chloropropylmethoxysilane; vinyltrichlorosilane; vinyltriethoxysilane; vinyl-propyl trimethoxysilane; (3,4-ethoxycyclohexyl) ethyl-trimethoxysilane; glicidoxypropyl trimethoxysilane; vinyl-triacetoxysilane; aminopropyl triethoxysilane or combinations of these. The examples of coupling agents are given by way of illustration and not by way of limitation. The more preferred coupling agent is vinyltriethoxysilane.

Clarifying agents may be used to increase the transparency and decrease the haze of the film. The clarifying agents are nucleating agents which decrease the haze and increase the transparency of the film by decreasing the amount of crystallinity, and controlling the size and uniformity of the crystals in the film. The processing conditions (e.g., cooling rate) of the film can also affect the amount, size and uniformity of crystals in the film. The preferred clarifying agents are organic nucleators. Examples of organic nucleators which may be used include for example polyol acetals. The more preferred clarifying agents are polyol acetals sold under the tradenames Millad 3940 and manufactured by Milliken Chemicals of Spartanburg, S.C., and Mark 2180 manufactured by Witco Corporation, New York, N.Y. UV and IR light absorbers may be used to provide the film and the laminated product with particular absorption and reflection characteristics, and pigments and other optical effect additives may be used to provide the film with special colors (e.g., shade band, etc) and other optical effects.

The film produced from these acrylate blends preferably has a tensile strength at break greater than about 13.0 N/mm$^2$, more preferably greater than about 14.0 N/mm$^2$, and most preferably greater than about 16.0 N/mm$^2$. Preferably the elongation at break is greater than about 400 percent, more preferably greater than about 500 percent, and most preferably greater than about 700 percent. Preferably, the water content upon storage at 50 percent relative humidity at 50° C. for 14 days is less than about 0.20 percent by weight, more preferably less than about 0.15 percent by weight, and most preferably less than about 0.10 percent. Preferably, the tear strength is greater than about 24.0 N/mm, more preferably greater than about 27.0 N/mm, and most preferably greater than about 30.0 N/mm. Preferably, the softening point is greater than about 80° C., more preferably greater than 105° C., and most preferably greater than about 115° C.

The process for manufacturing the film of the invention comprises the steps of mixing and heating the thermoplastic polymer resins to form an acrylate blend or in the preferred embodiment an ethylene butyl acrylate/ethylene methyl acrylate blend, wherein the ethylene butyl acrylate/ethylene methyl acrylate blend of thermoplastic polymer resins comprises components (a) and (b) and optionally (c) as described above; and forming the ethylene butyl acrylate/ethylene methyl acrylate blend of thermoplastic resins into a film.

The processing of a film from Components (a), (b) and optionally (c) can be accomplished by mixing the components along with the application of heat. The mixing of the components and the application of heat can take place in any order including the mixing of the components before, during, or after the application of heat.

The processing temperatures required for mixing the blend and forming the film are affected by many factors including pressure, time at temperature, whether the heat is applied before, during or after mixing, and the degree of mixing. Depending on the processing technique used the blend can be formed into pellets or other shapes known to those skilled in the art for further processing or can be directly formed into the desired film.

The preferred method of processing comprises forming pellets or other shaped pieces by heating and mixing the components (a), (b) and optionally (c) simultaneously. The pellets or other shaped pieces may be formed into a film by for example extrusion, casting or blow-extrusion or other means for producing film known to those skilled in the art. Extrusion is the preferable method of forming the film, and if extrusion is used the extruder is preferably equipped with a flat or ring die. The film is preferably formed at temperatures from about 160° C. to about 240° C., more preferably at temperatures from about 170° C. to about 230 ° C., and most preferably from about 180° C. to about 220° C.

The formed film may be used as an interlayer in a laminate. Preferably, the laminate can be formed comprising at least two layers separated by at least one interlayer, wherein the interlayer is a film formed from components (a), (b) and optionally (c) described above.

The lamina or sheets used to form the laminate can be flat or bent. The lamina or sheets can be glass, glass-ceramic or polymers. Examples of polymers which may be used include polymethyl methacrylate and polycarbonate. These examples of polymers are given as an illustration and not as a limitation. The preferred glass would be a soda-lime-silicate glass which is commonly used in the flat glass industry. The interlayer is the film described above as a ethylene butyl acrylate/ethylene methyl acrylate blend with or without additives.

Generally, the laminate comprises at least one lamina laminated to a polymer interlayer, however, when the laminate comprises at least two lamina the laminate is formed comprising x number of sheets separated by x-1 number of layers of polymer interlayer wherein x is at least two. The sheets can be of any thickness, however, for the process of lamination it is preferred that the sheets are from about 0.25 to about 12.7 mm thick, more preferably from about 1.25 to about 5 mm thick, and most preferably from about 1.5 to about 3.5 mm thick. The sheets and the interlayer can be laminated together by processes known to those skilled in the art. An example of process used to mature the laminate is the use of an autoclave which is given by way of illustration and not by way of limitation.

Laminates made using this film are made from an acrylate blend and two lamina, wherein the film is laminated between the two lamina, and wherein the laminate has the following properties.

The laminate preferably has a luminous transmittance which is greater than about 82.0 percent, more preferably greater than about 85.0 percent, and most preferably greater than about 87.0 percent. Preferably, the laminate's haze is less than about 1.0 percent, more preferably less than about 0.5 percent, and most preferably less than about 0.35 percent. Preferably, the peel strength is greater than about 15 N/cm, more preferably greater than about 20 N/cm, and most preferably greater than about 30 N/cm. Preferably, the laminate can further pass the standard German penetration test DIN 52338.

In order that persons in the art may better understand the practice of the present invention, the following Examples are provided by way of illustration, and not by way of limitation. Additional background information known in the art may be found in the references and patents cited herein, which are hereby incorporated by reference.

EXAMPLES

Example 1
Processing of EBAC/ERAC Films

Ethylene Butyl Acrylate/Ethylene Methyl Acrylate blends were produced by mixing the melts of these two thermoplastic resins (some blends further included a certain package of additives). Blends using an additive package comprised 100 parts by weight acrylate blend along with 0.3 parts by weight of vinyltriethoxysilane as a coupling agent, 1 part by weight of dicumyl peroxide as a crosslinking agent sold under the trade name of Luprasol 101 from ElfAtochem Company, Philadelphia, Penn., and 1 part by weight of a polyol acetal as a clarifying agent sold under the trade name Millad 3940 and manufactured by Milliken Chemicals of Spartanburg, S.C. All formulations were premixed in a dry high speed (turbo) mixer at 300 rpm for 30 minutes, then blended and extruded in a twin-screw extruder (Model ZSK-30 made by Werner and Pfleider Co. of Ramsey, N.J. into strings. The strings were then cut into pellets of a standard size. The extruder had a temperature at the barrel entrance of 132–140° C., and a die temperature of 196° C.

The extruded pellets were processed into films using a cast film line consisting of a single screw extruder Model No. 20IN20 made by Davis Standard of Pawcatuck, Conn. The screw of the extruder had a diameter of 50.8 mm and a relative barrel length of 24 diameters. The extruder was equiped with a flat extrusion die having an orifice which was 45.72 cm wide. Films of two thicknesses 0.18 mm and 0.36 mm were produced from each blend. Table I describes the blends produced. An experimental design program was used to reduce the number of samples necessary to cover the full range of possible combinations of the EMAC and EBAC blends.

TABLE I

| Sample No. | Polymer Components | content of Acrylate Groups (wt %) | Melt Flow Rate (g/10 min) | Content of Components (wt %) |
|---|---|---|---|---|
| 1 | PVB | — | | |
| 2 | EVA | — | | |
| 3 | EMAC | 8 | 6.0 | 100 |
| 4 | EMAC | 12 | 6.0 | 100 |
| 5 | EMAC | 20 | 0.5 | 100 |
| 6 | EMAC | 20 | 2.0 | 100 |
| 7 | EMAC | 20 | 3.5 | 100 |
| 8 | EMAC | 20 | 6.0 | 100 |
| 9 | EMAC | 20 | 20.0 | 100 |
| 10 | EMAC | 20 | 100.0 | 100 |
| 11 | EMAC | 24 | 2.0 | 100 |
| 12 | EMAC | 24 | 6.0 | 100 |
| 13 | EMAC | 24 | 20.0 | 100 |

TABLE I-continued

| Sample No. | Polymer Components | content of Acrylate Groups (wt %) | Melt Flow Rate (g/10 min) | Content of Components (wt %) |
|---|---|---|---|---|
| 14 | EMAC | 28 | 2.0 | 100 |
| 15 | EMAC | 28 | 100.0 | 100 |
| 16 | EMAC | 32 | 6.0 | 100 |
| 17 | EMAC | 42 | 2.0 | 100 |
| 18 | EBAC | 8 | 2.0 | 100 |
| 19 | EBAC | 18 | 0.5 | 100 |
| 20 | EBAC | 20 | 0.5 | 100 |
| 21 | EBAC | 20 | 2.0 | 100 |
| 22 | EBAC | 20 | 6.0 | 100 |
| 23 | EBAC | 20 | 20.0 | 100 |
| 24 | EBAC | 28 | 3.0 | 100 |
| 25 | EBAC | 36 | 2.0 | 100 |
| 26 | EBAC | 18 | 0.5 | 99 |
|    | EMAC | 20 | 2.0 | 1 |
| 27 | EBAC | 18 | 2.0 | 95 |
|    | EMAC | 20 | 2.0 | 5 |
| 28 | EBAC | 18 | 6.0 | 95 |
|    | EMAC | 20 | 2.0 | 5 |
| 29 | EBAC | 18 | 0.5 | 85 |
|    | EMAC | 20 | 2.0 | 15 |
| 30 | EBAC | 18 | 2.0 | 50 |
|    | EMAC | 20 | 2.0 | 50 |
| 31 | EBAC | 18 | 2.0 | 80 |
|    | EMAC | 20 | 2.0 | 20 |
| 32 | EBAC | 18 | 2.0 | 95 |
|    | EMAC | 20 | 2.0 | 5 |
| 33 | EBAC | 20 | 2.0 | 95 |
|    | EMAC | 24 | 2.0 | 5 |
| 34 | EBAC | 20 | 2.0 | 50 |
|    | EMAC | 24 | 2.0 | 50 |
| 35 | EBAC | 20 | 2.0 | 5 |
|    | EMAC | 24 | 2.0 | 95 |
| 36 | EBAC | 20 | 6.0 | 99 |
|    | EMAC | 24 | 2.0 | 1 |
| 37 | EBAC | 20 | 6.0 | 95 |
|    | EMAC | 24 | 2.0 | 5 |
| 38 | EBAC | 20 | 6.0 | 50 |
|    | EMAC | 24 | 2.0 | 50 |
| 39 | EBAC | 20 | 6.0 | 1 |
|    | EMAC | 24 | 2.0 | 99 |
| 40 | EBAC | 20 | 6.0 | 95 |
|    | EMAC | 32 | 2.0 | 5 |
| 41 | EBAC | 20 | 6.0 | 50 |
|    | EMAC | 32 | 2.0 | 50 |
| 42 | EBAC | 20 | 2.0 | 1 |
|    | EMAC | 32 | 6.0 | 99 |
| 43 | EBAC | 20 | 2.0 | 50 |
|    | EMAC | 32 | 20.0 | 50 |
| 44 | EBAC | 20 | 2.0 | 5 |
|    | EMAC | 32 | 20.0 | 95 |
| 45 | EBAC | 20 | 6.0 | 25 |
|    | EMAC | 28 | 100.0 | 75 |
| 46 | EBAC | 20 | 6.0 | 5 |
|    | EMAC | 28 | 100.0 | 95 |
| 47 | EBAC | 20 | 6.0 | 0.5 |
|    | EMAC | 28 | 100.0 | 99.5 |
| 48 | EBAC | 20 | 20.0 | 10 |
|    | EMAC | 32 | 6.0 | 90 |
| 49 | EBAC | 20 | 6.0 | 5 |
|    | EMAC | 24 | 6.0 | 95 |
| 50 | EBAC | 20 | 20.0 | 2 |
|    | EMAC | 32 | 6.0 | 98 |
| 51 | EBAC | 20 | 20.0 | 50 |
|    | EMAC | 28 | 100.0 | 50 |
| 52 | EBAC | 20 | 20.0 | 3 |
|    | EMAC | 28 | 100.0 | 97 |
| 53 | EBAC | 28 | 2.0 | 5 |
|    | EMAC | 24 | 20.0 | 95 |
| 54 | EBAC | 28 | 2.0 | 20 |
|    | EMAC | 24 | 20.0 | 80 |
| 55 | EBAC | 28 | 2.0 | 5 |
|    | EMAC | 24 | 20.0 | 95 |

The barrel of the extruder was divided into six heating zones progressively increasing the temperature of the blend up to the die. The barrel temperature was maintained in each of zones 1–6 at 180, 190, 200, 200, 200 and 210° C., respectively. The temperature of the extrusion die was maintained at approximately 200° C. The pressure to which the blend was subjected was measured for both the 0.18 and 0.36 mm thick films. The pressure at the end of the screw was 1390 and 1260 psi, respectively, and in the die was 815 and 770 psi, respectively. The speed of the screw was maintained at between 10–14 rpm for 0.18 mm thick films and 16–21 rpm for 0.36 mm thick films.

Each film was extruded and cooled using a three roll casting roll stock and was wound on to 7.6 cm cores. Fifteen samples were cut for testing from each film produced. At each of five sampling locations which were 20 linear feet apart, samples were obtained at three points across the film (from each of the edges and from the middle).

Example 2

Film samples produced according to Example 1 from EMAC, EBAC and combinations of EMAC and EBAC were tested for water content after storage, softening point, tensile strength, elongation at break, tear strength, transmittance and haze, and compared with the properties of polyvinyl butyral film (PVB) sold under the trade name Saflex SR 41 manufactured by Monsanto of St. Louis, Mo., and ethylene-vinyl acetate film (EVA) sold under the trade name EVA Poly BD 300 made by Elf Atochem, Philadelphia, Penn. which are used worldwide as interlayers in safety glass manufacturing (These films were used as controls due to the extensive use of PVB and EVA in the flat glass industry for making safety glass). The average results for each film sample and their commercial counterparts are shown in Table II.

TABLE II

| Sample (No.) | Tensile Strength at break (N/mm2) | Elongation at break (%) | Tear Strength (N/mm) | Water content after storage (wt %) | Transmittance (%) | Haze (%) | Softening Point (° C.) |
|---|---|---|---|---|---|---|---|
| Competitive Samples | | | | | | | |
| 1. | 20–25 | 300 | 15 | 0.5 | 87–88 | 0.5 | 106–130 |
| 2. | 16 | 700 | 15–17 | 0.3 | 83–85 | 0.5–1.1 | 76–114 |
| 3. | 13 | 740 | 28.5 | <0.1 | 85 | 17.2 | 78 |
| additives- | 15 | | | | 88 | 7.9 | 115 |
| 4. | 13 | 700 | 27.5 | <0.1 | 87 | 14.5 | 80 |
| additives- | 15 | | | | 89 | 5.4 | 115 |
| 5 | 14 | 780 | 32.0 | <0.1 | 88 | 7.9 | 82 |
| additives- | 16 | | | | 90 | 1.1 | 117 |
| 6. | 14 | 740 | 30.0 | <0.1 | 88 | 7.9 | 83 |
| additives- | 16 | | | | 90 | 1.1 | 117 |
| 7. | 13.5 | 700 | 28.5 | <0.1 | 88 | 7.9 | 80 |
| additives- | 15 | | | | 89 | 1.1 | 117 |
| 8. | 13 | 680 | 27.5 | <0.1 | 88 | 7.7 | 81 |
| additives- | 14.5 | | | | 90 | 1.1 | 115 |
| 9. | 13.4 | 650 | 25.5 | <0.1 | 87 | 5.8 | 77 |
| additives- | 16 | | | | 89 | 1.0 | 114 |
| 10. | 14 | 600 | 24.5 | <0.1 | 88 | 5.4 | 83 |
| additives- | 16.5 | | | | 91 | 0.8 | 115 |
| 11. | 14 | 790 | 31.0 | <0.1 | 88 | 4.8 | 82 |
| additives- | 16 | | | | 92 | 0.7 | 114 |
| 12. | 13.5 | 750 | 30.0 | <0.1 | 88 | 4.2 | 84 |
| additives- | 15 | | | | 92 | 0.7 | 114 |
| 13. | 14 | 690 | 28.0 | <0.1 | 88 | 4.3 | 84 |
| additives- | 16.5 | | | | 92 | 0.6 | 114 |
| 14. | 14.5 | 800 | 31.0 | <0.1 | 87 | 4.2 | 85 |
| additives- | 17 | | | | 91 | 0.5 | 114 |
| 15. | 13 | 500 | 26.0 | <0.1 | 88 | 7.9 | 85 |
| additives- | 14 | | | | 93 | 1.1 | 114 |
| 16. | 14.5 | 640 | 28.5 | <0.1 | 87 | 5.8 | 84 |
| additives- | 17 | | | | 91 | 0.5 | 116 |
| 17. | 15 | 650 | 28.5 | <0.1 | 88 | 4.3 | 85 |
| additives- | 16 | | | | 93 | 0.5 | 117 |
| 18 | 14 | 800 | 33.5 | <0.1 | 78 | 17.2 | 87 |
| additives- | 14.5 | | | | 86 | 6.8 | 119 |
| 19. | 18.5 | 950 | 34.5 | <0.1 | 79 | 14.8 | 88 |
| additives- | 19 | | | | 88 | 6.0 | 118 |
| 20. | 18.5 | 950 | 35.5 | <0.1 | 80 | 8.8 | 88 |
| additives- | 19 | | | | 89 | 5.4 | 119 |
| 21. | 17.5 | 900 | 36.0 | <0.1 | 81 | 5.8 | 88 |
| additives- | 18.5 | | | | 89 | 3.3 | 118 |
| 22. | 14 | 860 | 35.5 | <0.1 | 81 | 5.8 | 86 |
| additives- | 17 | | | | 88 | 1.6 | 119 |
| 23. | 15.5 | 790 | 31.0 | <0.1 | 79 | 6.9 | 86 |
| additives- | 17.5 | | | | 87 | 1.6 | 117 |
| 24. | 16 | 890 | 32.5 | <0.1 | 79 | 5.4 | 87 |
| additives- | 19.5 | | | | 88 | 0.9 | 120 |
| 25. | 17.5 | 950 | 34.0 | <0.1 | 78 | 5.1 | 87 |

TABLE II-continued

| Sample (No.) | Tensile Strength at break (N/mm2) | Elongation at break (%) | Tear Strength (N/mm) | Water content after storage (wt %) | Transmittance (%) | Haze (%) | Softening Point (° C.) |
|---|---|---|---|---|---|---|---|
| additives- | 19.5 | | | | 87 | 0.7 | 119 |
| 26. | 14 | 400 | 33.0 | <0.1 | 89.5 | 18 | 77 |
| additives- | | | | | | 6 | 114 |
| 27. | 16 | 680 | 29.0 | <0.1 | 88.5 | 11 | 79 |
| additives- | | | | | | 6 | 116 |
| 28. | 16.5 | 690 | 30.0 | <0.1 | 89.0 | 10 | 80 |
| additives- | | | | | | 4 | 117 |
| 29. | 17 | 700 | 32.0 | <0.1 | 91.5 | 9 | 81 |
| additives- | | | | | | 3 | 117 |
| 30. | 18 | 720 | 33.5 | <0.1 | 90.5 | 9 | 82 |
| additives- | | | | | | 3 | 118 |
| 31. | 17.5 | 750 | 33.0 | <0.1 | 91.1 | 9 | 82 |
| additives- | | | | | | 2 | 117 |
| 32. | 16.5 | 690 | 35.0 | <0.1 | 90.5 | 4.8 | 80 |
| additives- | | | | | | 0.6 | 116 |
| 33. | 16.5 | 680 | 33.5 | <0.1 | 89.5 | 6.8 | 82 |
| additives- | | | | | | 0.7 | 117 |
| 34. | 17 | 700 | 31.0 | <0.1 | 88.5 | 8.5 | 82 |
| additives- | | | | | | 1.1 | 118 |
| 35. | 16 | 750 | 30.0 | <0.1 | 89.6 | 5.4 | 86 |
| additives- | | | | | | 0.3 | 120 |
| 36. | 18 | 830 | 34.0 | <0.1 | 90.0 | 8.3 | 85 |
| additives- | | | | | | 1.0 | 118 |
| 37. | 17.5 | 800 | 35.0 | <0.1 | 89.4 | 7.4 | 84 |
| additives- | | | | | | 1.1 | 117 |
| 38. | 17.5 | 730 | 31.5 | <0.1 | 89.0 | 7.8 | 83 |
| additives- | | | | | | 1.1 | 118 |
| 39. | 16 | 670 | 27.0 | <0.1 | 86.0 | 11 | 82 |
| additives- | | | | | | 0.3 | 116 |
| 40. | 16.5 | 690 | 31.5 | <0.1 | 89.5 | 7 | 83 |
| additives- | | | | | | 0.6 | 117 |
| 41. | 17.5 | 720 | 31.5 | <0.1 | 89.5 | 7 | 83 |
| additives- | | | | | | 0.6 | 118 |
| 42. | 16.5 | 690 | 28.5 | <0.1 | 90.5 | 5.5 | 83 |
| additives- | | | | | | 0.3 | 117 |
| 43. | 18.5 | 820 | 33.0 | <0.1 | 92.5 | 5.5 | 86 |
| additives- | | | | | | 0.6 | 119 |
| 44. | 19 | 840 | 31.0 | <0.1 | 91.1 | 4.3 | 86 |
| additives- | | | | | | 0.3 | 119 |
| 45. | 19 | 550 | 26.0 | <0.1 | 89.0 | 7.8 | 86 |
| additives- | | | | | | 1.1 | 117 |
| 46. | 16 | 600 | 25.5 | <0.1 | 82.0 | 5.8 | 84 |
| additives- | | | | | | 0.4 | 114 |
| 47. | 15 | 550 | 24.5 | <0.1 | 87.0 | 9.0 | 80 |
| additives- | | | | | | 1.4 | 114 |
| 48. | 17 | 700 | 34.0 | <0.1 | 89.5 | 6.0 | 84 |
| additives- | | | | | | 0.3 | 119 |
| 49. | 19 | 900 | 36.5 | <0.1 | 92.5 | 5.4 | 84 |
| additives- | | | | | | 0.3 | 119 |
| 50. | 18 | 840 | 34.0 | <0.1 | 90.5 | 5.0 | 82 |
| additives- | | | | | | 0.3 | 117 |
| 51. | 15 | 550 | 24.5 | <0.1 | 87.0 | 9.0 | 84 |
| additives- | | | | | | 1.1 | 117 |
| 52. | 15 | 550 | 23.5 | <0.1 | 85.0 | 11.4 | 85 |
| additives- | | | | | | 1.3 | 116 |
| 53. | 18 | 840 | 32.5 | <0.1 | 88.5 | 7.8 | 87 |
| additives- | | | | | | 1.0 | 118 |
| 54. | 18 | 700 | 30.0 | <0.1 | 90.0 | 6.4 | 88 |
| additives- | | | | | | 0.3 | 119 |
| 55. | 18.5 | 850 | 34.5 | <0.1 | 90.5 | 5.6 | 87 |
| additives- | | | | | | 0.3 | 118 |

The test for water content after storage was performed by measuring the change in weight of the sample before and after exposing a sample of film to 50% relative humidity at 20° C. for 14 days. The softening point was measured on a DSC using a heating at a rate of 2.5° C. per minute. The elongation on break and tensile strength was determined by using ASTM D-638 testing method. The test for tear strength was performed using ASTM D-882 testing method. The transmission and the haze were measured after laminating 0.4 mm film between two layers of 3 mm thick sheets of clear, soda-lime-silicate glass. The transmission was measured using ANSI Standard Z26.1T2. The haze was measured using German Standard DIN R43-A.3/4.

The results of the films made from 100% EBAC resin show that EBAC films containing 8–16 percent by weight of butyl acrylate groups have a relatively low transparency and high haze. The results indicate that as the amount of acrylate groups in the film increase from 16 to 26 percent by weight this leads to a significant improvement in the optical properties of the EBAC film with the best optical properties being found when the amount of acrylate in the film is between 18 and 22 percent by weight. While the transparency and haze of these films improve, the improvement is not enough to consider using these films as a substitute for PVB or EVA as a glass interlayer.

The results further show that EBAC films have excellent mechanical properties which appear to be superior to PVB, EVA and EMAC films. The brittleness at low temperatures is independent of the molecular weight (melt flow rate) and acrylate content, however, the tensile strength, elongation on break and tear resistance are optimal when the melt flow rate of the EBAC is between 0.5 and 6.0 grams/10 minutes and these properties decrease when the melt flow rate of the EBAC exceeds 6.0 grams/10 minutes.

The results show that films made from 100% EMAC resin with acrylate content of 8 to 42 percent by weight are more transparent and have a lower haze than EBAC films. The optimal optical properties of EMAS occur when the acrylate content of the film is between 22 to 27 percent by weight. The results further show that while the mechanical properties of these films do not compare with those of the EBAC film that the mechanical properties can be optimized by using resin with a melt flow rate in the range of 0.5 to 20.0 grams/10 minutes, and can be further optimized by using resin with a melt flow rate in the range of 2.0 to 6.0 grams/10 minutes.

The results show that films made from combinations of EMAC and EBAC films can combine both the excellent optical and bonding properties of the EMAC with the excellent mechanical properties and thermal properties of the EBAC. These combinations in particular give superior properties when the ethylene butyl acrylate copolymer (EBAC) is from about 20 percent to about 5 percent by weight of the combination of ethylene butyl acrylate/ethylene methyl acrylate and the ethylene methyl acrylate (EMAC) is from about 80 percent to about 95 percent by weight of the combination of ethylene butyl acrylate/ethylene methyl acrylate, the EBAC has an acrylate content of 18 to 22 percent by weight and a melt flow rate of 0.5 to 6.0 grams/10 minutes, and the EMAC has an acrylate content of 20 to 27 percent by weight and a melt flow rate of 2.0 to 6.0 grams/10 minutes.

Example 3

Film samples produced according to Example 1 from EMAC, EBAC and combinations of EMAC and EBAC were used to manufacture a number of samples of laminates. These samples were produced using Saint Gobains "pilot technology" to simulate the manufacturing technology. Clear soda-lime-silicate glass sheets of 3 mm thickness and dimensions of 50×50 cm were cleaned using acetone to remove dust, grease and other contaminations from the glass surface. Prior to this the PVB for the control samples was dried for several hours to reduce the moisture content to 0.5% by weight or lower, and was used for lamination immediately after this operation. The other films investigated in this disclosure did not require a drying step before lamination.

For laminating, a piece of film was cut to obtain a sample which is 50×50 cm. This sample was then put onto the surface of the bottom glass sheet and pressed onto the glass sheet using a rubber roll. Another glass sheet was placed on top of the film obtaining a "sandwich" structure which is then clamped. This "sandwich" was then placed in an autoclave and heated to a temperature of between 110–115° C. while drawing a vacuum of 3–5 ×10$^{-2}$ mm of Hg. This melts the film surfaces while eliminating air between the layers. The "sandwich" structure was held in the autoclave under these conditions for 3 hours during which time a safety glass laminate was produced.

The glass/film (interlayer)/glass laminates were peel tested, boil tested, humidity tested, light stability tested and penetration tested, and compared with the properties of polyvinyl butyral film (PVB) sold under the registered trademark Saflex SR 41 manufactured by Monsanto of St. Louis, Mo., and ethylene-vinyl acetate film (EVA) sold under the trade name EVA Poly BD 300 manufactured by Elf Atochem, Philadelphia, Penn. which are used worldwide as interlayers in safety glass manufacturing. The average results for each laminate and their commercial counterparts are shown in Table III.

TABLE III

| Sample (No.) | Peel Test (N/cm) | Boil Test | Humidity Test | Light Stability Test | Penetration at drop height | | |
|---|---|---|---|---|---|---|---|
| | | | | | 1.5 m | 2.0 m | 2.5 m |
| 1 | 15–20 | Haze in edge 3–4 mm. | Haze in edge 3–4mm. | No visible change. | no | no | no |
| 2 | 10–12 | Haze in edge 3–4 mm. | Haze in edge 3–4 mm. | No visible change. | no | no | yes |
| 27 | 2–4 | Bubbles in edge 4–5 mm. | Bubbles in edge 3–4 mm. | No visible change. | no | no | yes |
| 28 | 3–5 | Bubbles in edge 4–5 mm. | Bubbles in edge 3–4 mm. | No visible change. | no | no | no |
| 29 | 8–10 | Bubbles in edge 4–5 mm. | Bubbles in edge 3–4 mm. | No visible change. | no | no | no |
| 30 | 10–11 | Haze in edge 3–4 mm, but reversible. | Haze in edge, but reversible. | No visible change. | no | no | no |
| 32 | 11–12 | No haze | No haze | No visible change. | no | no | no |
| 33 | 11–13 | No haze | No haze | No visible change. | no | no | no |
| 34 | 13–14 | No haze | No haze | No visible change. | no | no | yes |
| 35 | 20–30 | No haze | No haze | No visible change. | no | no | yes |
| 38 | 15–17 | No haze | No haze | No visible change. | no | no | no |
| 39 | 15–20 | No haze | No haze | No visible change. | no | no | no |
| 44 | 20–30 | No haze | No haze | No visible change. | no | no | no |
| 48 | 15–20 | No haze | No haze | No visible change. | no | no | no |
| 53 | 20–30 | No haze | NO haze | No visible change. | no | no | yes |
| 54 | 15–20 | No haze | No haze | No visible change. | no | no | yes |
| 55 | 20–30 | No haze | No haze | No visible change. | no | no | no |

The humidity test was performed by exposing the laminate to 100% relative humidity at 50° C. for 14 days and then examining the laminate visually for any signs of haze. The peel test was performed by peeling the film from the glass. The boil test stability was determined by boiling a sample of the laminate in water for 2 hours at 100° C. and then visually examining the sample for haze. The light stability test was performed by aging a sample of the laminate with a UV-Bulb #5 using an intensity of 0.5 watts/m$^2$ for 100 hours and then examining the laminate for any visual changes. The pentration test was performed using the German Standard DIN 52338 which is similar to the U.S. ball drop standard. This is a pass-fail type of test. According to this method a 50×50 cm sample of the laminate is cut from a safety glass sheet. The laminate was placed on a solid metered concrete substrate. A ball of 2,260 grams is used. The laminate passes if no penetration occurs while it is considered a failure if the ball is able to penetrate the laminate. The tests start with the smallest height of drop of the ball of 1.5 m, then if positive results are obtained, the test is repeated by increasing to the height of 2.0 m and dropping the ball on a similar new specimen, and if no failure the test is repeated increasing the height of the drop to 2.5 m. If positive results are achieved at the last height the safety glass is considered to have passed the penetration test.

The results indicated that the EMAC and EMAC/EBAC film blends are equivalent or superior to films and laminates produced from the known PVB and EVA based formulations. These films have the further advantage in laminating of not needing plastisizers, having a low water content after storage thereby eliminating the need for humidity control during manufacturing, having a very high thermal stability, are non-corrosive (i.e., do not need specialized equipment for manufacturing), and are bondable to glass without the use of bonding agents.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A transparent laminate having a peel test strength of at least 8N/cm, comprising at least one lamina and at least one interlayer wherein the interlayer is comprised of a film formed from a blend of components (a), an ethylene butyl acrylate copolymer (EBAC), having about 8 to 36% by weight of acrylate groups; and
    (b), an ethylene methyl acrylate copolymer (EMAC), having about 8 to about 42 percent by weight of acrylate groups; wherein the blend of components (a) and (b) contains from about 5% to less than about 95%, by weight, of component (a) and greater than about 5% to about 95% by weight, of component (b).

2. The laminate in claim 1, wherein component (a) has a content of acrylate groups from about 16 to about 26 percent by weight.

3. The laminate in claim 2, wherein component (a) has a content of acrylate groups from about 18 to about 22 percent by weight.

4. The laminate in claim 1, wherein component (b) has a content of acrylate groups from about 20 to about 32 percent by weight.

5. The laminate in claim 4, wherein component (b) has a content of acrylate groups from about 22 to about 27 percent by weight.

6. The laminate in claim 1, wherein the melt flow rate of component (a) is from about 0.5 to about 20.0 grams/10 minutes.

7. The laminate in claim 6, wherein the melt flow rate of component (a) is from about 0.5 to about 10.0 grams/10 minutes.

8. The laminate in claim 1, wherein the melt flow rate of component (b) is from about 0.5 to about 100 grams/10 minutes.

9. The laminate in claim 8, wherein the melt flow rate of component (b) is from about 0.5 to about 20.0 grams/10 minutes.

10. The laminate in claim 1, wherein the amount of component (a) present in the film is from about 50 percent to about 5 percent by weight of the total weight of components (a) and (b), and the amount of component (b) present in the film is from about 50 percent to about 95 percent by weight of the total weight of components (a) and (b).

11. The laminate in claim 10, wherein the amount of component (a) present in the film is from about 20 percent to about 5 percent by weight of the total weight of components (a) and (b), and the amount of component (b) present in the film is from about 80 percent to about 95 percent by weight of the total weight of components (a) and (b).

12. The laminate in claim 1, further including a component (c) comprising at least one additive selected from the group consisting of a cross-linking agent, a coupling agent, a clarifying agent, a UV-light-absorber, a IR-light absorber, a pigment and an optical effect additive.

13. The laminate in claim 12, wherein component (c) comprises:
    (c)(i) a coupling agent, and
    (c)(ii) a clarifying agent.

14. The laminate in claim 12, wherein component (c) comprises:
    (c)(i) a cross-linking agent,
    (c)(ii) a coupling agent, and
    (c)(iii) a clarifying agent.

15. The laminate in claim 12, wherein the component (c) is from about 0.25 to about 15.0 percent by weight of the total of components (a), (b) and (c).

16. The laminate in claim 15, wherein the component (c) is from about 1.0 to about 5.0 percent by weight of the total of components (a), (b) and (c).

17. The laminate in claim 14, wherein the the amount of the coupling agent (c) (i) present in the film consists of from about 0.1 percent to about 6 percent by weight of the total weight of components (a), (b) and (c), the amount of clarifying agent (c) (ii) present in the film consists of from about 0.05 percent to about 3.0 percent by weight of the total weight of components (a), (b) and (c), and the amount of cross-linking agent present in the film consists up to about 5 percent by weight of the total weight of components (a), (b) and (c).

18. The laminate in claim 17, wherein the the amount of the coupling agent (c) (i) present in the film consists of from about 0.2 percent to about 1.0 percent by weight of the total weight of components (a), (b) and (c), the amount of clarifying agent (c)(ii) present in the film consists of from about 0.5 percent to about 1.5 percent by weight of the total weight of components (a), (b) and (c), and the amount of cross-linking agent present in the film consists of from about 0.3 to about 2.5 percent by weight of the total weight of components (a), (b) and (c).

19. The laminate in claim 12, wherein the cross-linking agent is an organic peroxide.

20. The laminate in claim 12, wherein the coupling agent is a silane coupling agent.

21. The laminate in claim 18, wherein the lamina are selected from a group consisting of a glass, a glass-ceramic, and a polymer.

22. The laminate in claim 21, wherein the lamina is a glass.

23. The laminate in claim 22, wherein the glass is a soda-lime-silicate glass.

24. The laminate in claim 1, wherein the laminate is two lamina separated by one interlayer.

25. A transparent laminate comprising a film having a peel test strength of at least 8 N/cm made from an ethylene alkyl acrylate copolymer blend laminated between two lamina wherein the film has a tensile strength greater than about 13.0 psi, an elongation at break of greater than about 400 percent, a water content upon storage at 50% relative humidity at 50° C. for 14 days of less than about 0.1 percent by weight; and wherein the laminate has a visible transmission of greater than about 82.0 percent, a haze of less than about 1.0 percent when the film used in the laminate is about 0.4 mm thick, and passes the standard German penetration test for laminated safety glass DIN 52338.

26. The laminate in claim 25, wherein the lamina are selected from a group consisting of a glass, a glass-ceramic, and a polymer.

27. The laminate in claim 26, wherein the lamina is a glass.

28. The laminate in claim 27, wherein the glass is a soda-lime-silicate glass.

* * * * *